United States Patent [19]
Gruszecki et al.

[11] 3,870,708
[45] Mar. 11, 1975

[54] AMINE DERIVATIVES OF PENICILLINS AND THE METHOD OF THEIR PRODUCTION
[75] Inventors: Wojciech Gruszecki, Gdansk; Emil Taszer; Edward Borowski, both of Gdansk-Wrzeszcz, all of Poland
[73] Assignee: Politechnika Gdanska Instytut Chemii i Technologii Organicznej Oraz Zywnosciowej, Gdansk-Wrzeczcz, Poland
[22] Filed: Sept. 30, 1971
[21] Appl. No.: 185,382

[30] Foreign Application Priority Data
Oct. 1, 1970 Poland .................................. 143728

[52] U.S. Cl. ............................ 260/239.1, 424/271
[51] Int. Cl. ............................................. C07d 99/16
[58] Field of Search .................................. 260/239.1

[56] References Cited
UNITED STATES PATENTS

| | | | |
|---|---|---|---|
| 2,985,648 | 5/1961 | Doyle et al. | 260/239.1 |
| 3,080,356 | 3/1963 | Catlin et al. | 260/239.1 |
| 3,198,788 | 8/1965 | Granater | 260/239.1 |
| 3,340,252 | 9/1967 | Alburn et al. | 260/239.1 |

Primary Examiner—Nicholas S. Rizzo

[57] ABSTRACT

Amino derivatives of pencillin are produced by the acylation of 6-aminopenicillanic acid by oxazolidinone-5. The semi-synthetic penicillins thus produced, containing hydroxymethyl groups are transformed by known methods into amino derivatives of penicillin.

9 Claims, No Drawings

AMINE DERIVATIVES OF PENICILLINS AND THE METHOD OF THEIR PRODUCTION

BACKGROUND a. Field of the Invention

The invention relates to amine derivatives of penicillins and to methods for their production.

b. Description of the Prior Art

Several methods of production of amine derivatives of penicillin are known which consist of the protection of the amine group in acylating α-amino-acids, and then activation of their carboxyl group, as a result of which the active N-protected derivative of α-amino-acid is obtained.

Subsequently the amino group of 6-aminopenicillanic acid is acylated with this compound.

The product of the acylation reaction is the N-protected α-aminopenicillin in which subsequently the amino group protection is removed. The protection of the amino-group and the mode of its removal must be chosen so that during the reaction no decay of unstable penicillin groupings takes place.

In the above-mentioned two-stage operation, much technical effort has been devoted to obtain α-aminopenicillin in connection with the method of acylation, the method of protection of the amino group, or acylation and protection of the amino group simultaneously.

Penicillins with a free amino group existing in the α position in the side radical are precious antibiotics with wide antibacterial activity.

As a result of much investigation of the dependence of antimicrobial activity on the structure of penicillin derivatives it has been shown that antibiotics of this kind, especially α-aminobenzylpenicillin with configuration D (-) and its homologues show a therapeutical optimum of chemical compounds of this class.

The disadvantages of the methods used heretofore are the difficulties connected with proper protection of the amino group due to the necessity of its mild removal in a further stage. The active compounds used for acylation of penicillin are unstable, which produces in addition to the principal reaction product a number of undesired by-products which are difficult to be separated and exert a negative influence upon the quality and the yield of penicillin thus produced.

SUMMARY OF THE INVENTION

An object of the invention is to provide a method for the production of amino-derivative penicillins and the development of such production methods, which will enable the elimination of the aforesaid drawbacks.

This objective is achieved by obtaining amino-derivative penicillins having the following general formula:

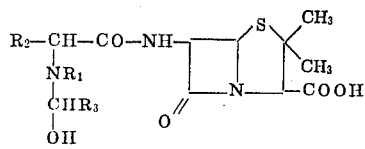

wherein $R_1$ is an acyl group or a group containing an oxycarbonyl radical, removable under mild conditions and having the general formula $$Y - O - CO -$$

wherein

Y is an alkyl group an aryl group or an aralkyl group, and $R_2$ and $R_3$ are hydrogen or a substituted or non-substituted alkyl, aryl, or aralkyl group.

The method according to the invention comprises reacting 6-aminopenicillanic acid or its salts with oxazolidinone-5 having the general formula

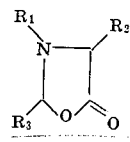

wherein $R_1$, $R_2$, $R_3$ are as defined above and then by possible liberation of the amino group of penicillin from protection by known methods, particularly by means of catalytic hydrogenolysis.

The advantages of the method according to the invention are that the oxazolidinones employed in the reaction are simply obtained, e.g. by the action of an aldehyde on α-amino-acid with an acyl protected amino group. The oxazolidinones are stable compounds well crystallizing, and unlike parent substances used in other acylation methods they can be stored without decomposition for a long time period, and can be produced in pure form.

The carbonyl group in oxazolidinone-5 is sufficiently active to undergo aminolysis in mild conditions, and its activity is such that this compound reacts only with amino groups. This permits obtaining semi-synthetic penicillins possessing in the side radical various functional groups, such as a hydroxyl group which in methods employed up to now should have been protected.

In the case of acylation by these compounds of 6-aminopenicillanic acid, the reaction time is short, and no decay of components is observed, and the yield of the acylation reaction is high, generally exceeding 80 percent.

Due to the specific reactivity of these compounds in relation to the amino group, the acylation of 6-aminopenicillanic acid by these compounds is unidirectional with high yield also in the presence of, for example, hydroxyl groups which are present in the solvent or in the initial acylating acid.

A high reaction yield in relation to the initial 6-aminopenicillanic acid is obtained by using an excess of the acylating oxazolidinone-5, which is easily separated after termination of the reaction, such as by washing with organic solvents.

The selectivity of acylation of the amino group of 6-aminopenicillanic acid and the possibility of easy removal of non-reacted substrates permits the required acylation product to be obtained in pure form.

An additional advantage of the method according to the invention is that the reaction takes its course with full conservation of the configuration.

As a result of the acylation of 6-aminopenicillanic acid by oxazolidinone-5 the resulting α-aminopenicillin with protected amino group and lacking hydrogen is thus incapable of unwanted side-reaction with active agents. The removal of the amino group protection is simple and is effected under the influence of hydrogenolysis.

DESCRIPTION OF THE PREFERRED EMBODIMENTS

The method according to the invention is illustrated by the following examples

EXAMPLE I

The product obtained in this Example is (R) - 3-benzyloxycarbonyl-4-phenyl-oxazolidinone-5. 540 mg α-benzyloxycarbonylaminophenylacetic R (-) acid is suspended in 2 ml acetic acid, and 0.38 ml acetic anhydride, 180 mg paraformaldehyde, and 0.03 ml thionyl chloride is added. The mixture is then heated within two hours until boiling under a reflux condenser, with protection against humidity. After cooling, crystals drop from the clear solution, which are then filtered and washed with n-heptane.

An additional amount of substance is obtained by thickening of lyes and adding of n-heptane. There are obtained 450 mg of white crystalline substance with melting point 132° - 134°C. Elementary analysis:

% calculated:   C - 68.69 H - 5.05 N - 4.71
% obtained:     C - 68.40 H - 5.40 N - 4.43
$[\alpha]_D^{25} = -178°$ (CHCl$_3$, c = 0.1)

Spectrum in infra-red: 1785, 1700, 1510, 1450, 1430, 1370, 1250, 1180, 1060 cm$^{-1}$.

EXAMPLE II

The product obtained in this Example is (R) - 3-(4-nitrobenzyloxycarbonyl)-4-phenyl-oxazolidinone-5. Similar to Example I the following mixture is heated until dissolving: 1.250 g (R) - (-) - (-α-4-nitrobenzyloxycarbonyl)-phenylacetic acid, 360 mg paraformaldehyde, 0.76 ml acetic anhydride, and 0.06 ml thionyl chloride in 5 ml acetic acid. After heating within 1 hour, the clear solution is allowed to crystallize, and after cooling there are filtered off 1.2 g crystalline substance, substantially insoluble in organic solvents. After its crystallization from ethyl acetate there is obtained a white substance in the shape of well formed needles, with a melting point 171° - 173°C. and a mixed melting point with initial nitrobenzyloxycarbonylaminoacetic acid of 153° - 160°C. Elementary analysis:

% calculated:   C - 59.63 H - 4.07 N - 8.14
% obtained:     C - 59.35 H - 4.17 N - 8.00
$[\alpha]_D^{25} = -146°$ (CHCl$_3$, c = 0.1)

Spectrum in infra-red very rich, contains bands: 1785 cm$^{-1}$, 1715 cm$^{-1}$, 1531 cm$^{-1}$ with several others with strong absorption.

EXAMPLE III

In this Example the obtained product is (S) - 3 - benzyloxycarbonyl-4-benzyloxazolidinone-5. This compound is obtained in a similar manner as in Example I, using as the substrate 1-phenylalanine.

Elementary analysis, spectrum in infra-red, optical rotation and melting point conform with data obtained for this compound by other methods.

EXAMPLE IV

In this Example, the obtained product is (S) - 3 - benzyloxycarbonyl-4-methyl-oxazolidinone-5. Similarly as in Example I, using L-alanine, the desired product is obtained having a melting point of 93° - 94°C. Elementary analysis:

% calculated:   C - 61.30 H - 5.5 N - 5.96
% obtained:     C - 61.08 H - 5.50 N - 5.81
$[\alpha]_D^{25} = +87.5°$ (CHCl$_3$, c = 0.1)

Spectrum in infra-red: 1790 cm$^{-1}$, 1710 cm$^{-1}$, and a number of other bands.

EXAMPLE V

In this Example, the obtained product is S-benzyloxycarbonyl-4-(p-methoxyphenyl)-oxazolidinone-5.

a. To a mixture of 315 mg d,l -α-(benzyloxycarbonylamino)-p-methoxyphenylacetic acid, 90 mg paraformaldehyde, 0.18 ml acetic anhydride, and 2 ml acetic acid there is added 0.015 ml thionyl chloride.

The resulting mixture is heated under a reflux condenser until boiling within 2 hours with protection against access of humidity.

After termination of the reaction, the acetic acid is distilled off. The residue is introduced in benzene and washed with sodium bicarbonate. The benzene is dried and evaporated and the remaining oily residue is crystallized. As a result of crystallization from the mixture, benzene: n-hexane there are obtained 220 mg of crystalline substance with melting point 89° - 91°C.

b. A mixture of 1.36 g d,l -α-(benzyloxycarbonylamino)-p-methoxyphenylacetic acid, 0.390 g paraformaldehyde, and 0.05 g p-toluenesulphonic acid in 100 ml benzene is subjected to azeotropic distillation within 1 hour. Thereafter, the benzene solution is washed with aqueous sodium bicarbonate solution, dried, and evaporated. There are obtained 1.34 g substance with identical spectrum in infra-red and melting point as in (a). Elementary analysis:

% calculated:   C - 66.05 H - 5.20 N - 4.28
% obtained:     C - 65.91 H - 5.37 N - 4.25
Spectrum in infra-red: 1805, 1785, 1710 cm$^{-1}$ and others.

EXAMPLE VI

In this Example the obtained product is 3-benzyloxycarbonyl-4-(p-hydroxyphenyl)-oxazolidinone-5.

A mixture of 903 mg d,l -α-(benzyloxycarbonylamino)-p-hydroxyphenylacetic acid, 160 mg paraformaldehyde, and 60 mg p-toluenesulphonic acid is azeotripically distilled with 100 ml ethylene chloride. After 1 hour the organic layer is washed off with an aqueous solution of sodium bicarbonate and the solvent evaporated. As a result, 810 mg of crystalline substance with a melting point 156° - 157°C. is obtained. Elementary analysis:

% calculated:   C - 65.17 H - 4.80 N - 4.47
% obtained:     C - 65.92 H - 5.28 N - 4.38
Spectrum in infra-red: 1820, 1790, 1700, 1460 and others.

EXAMPLE VII

In this Example the obtained product is the sodium salt of 6 - (-) [α-(N-hydroxymethyl-N-benzyloxycarbonyl-amino)-phenylacetamido]-penicillanic acid (N-hydroxymethyl-N-carbobenzoxyampicillin). A mixture of 600 mg (R)-3-benzyloxycarbonyl-4-phenyloxazolidinone-5, obtained according to Example I, 440 mg 6-aminopenicillanic acid, and 190 mg 2-hydroxypyridine is suspended in 2 ml pyridine and 0.4 ml triethylamine is added. The mixture is placed in a water bath at a temperature of 45° - 55°C. and the reaction is conducted while stirring the mixture within 2 hours.

After a lapse of a quarter hour the mixture becomes homogeneous with the consistency of thick oil of yellow color. After 2 hours, the oily substance is thickened by vacuum evaporation; the mixture is cooled and 50 ml water and ethyl acetate are introduced in the ratio 1:1.

If necessary, the aqueous layer is alkalized to pH 8. Thereafter, after shaking and separation, there is added to the aqueous layer 25 ml ether and the extraction is repeated.

The separated aqueous layer is covered with 100 ml ether and acidified with diluted hydrochloric acid to pH 2. After extraction of the precipitated penicillin, the aqueous layer is removed, and the ether layer washed with water.

At this stage, 800 mg penicillin with purity above 70 percent is contained in the ether layer.

The penicillin is changed to its sodium salt by means of 1 n sodium hydroxide in water-acetone solution and the solvents are vacuum evaporated to dryness. From the primary organic extracts through evaporation of solvents, the excess of the used oxazolidinone-5 in an amount of 100 mg is isolated, and can be returned to the reaction.

The sodium salt of the penicillin obtained shows a purity above 70 percent, as determined iodometrically. The spectrum in infra-red shows a distinct absorption in the region of β-lactam of 1780 cm$^{-1}$ and urethanic 1705 - 1670 cm$^{-1}$. On the other hand, as compared with the spectrum of sodium salt of N-carbobenzoxyampicillin, there occur distinct differences in the dactyloscopic part of the spectrum.

One inseparable band at 1035 cm$^{-1}$ is evidence of the presence of the methoylol group.

Thin-layer chromatography on silica gel also shows differences R$_f$ of these two penicillins.

EXAMPLE VIII

In this Example the product obtained is the sodium salt of 6-[- (-) -α-(N-hydroxymethyl-N-p-nitrobenzyloxycarbonyl-amino) -phenylacetamido]-penicillanic acid.

Similarly as in Example VII there is heated a mixture of 700 mg (R) - 3 - (4'-nitrobenzyloxycarbonylamino) 4-phenyl-oxazolidinone-5, obtained according to Example II, 440 mg 6-aminopenicillanic acid, 190 mg 2-hydroxypyridine, and 0.4 ml triethylamine in 2 ml of dry pyridine.

The reaction conditions are the same.

There are obtained: 930 mg penicillin in the form of acid which has been changed to sodium salt, as in Example VII.

The iodometric titration shows above 60 percent pure penicillin.

The spectrum in infra-red in KBr shows absorption bands within the range of 1780 cm$^{-1}$, wide flat band 1725 - 1660 cm$^{-1}$, 1537 and 1352 cm$^{-1}$, and wide band 1020 - 1060 cm$^{-1}$.

EXAMPLE IX

In this Example the product obtained is the sodium salt of 6-[- (-) -α-(N-hydroxymethyl-N-benzyloxycarbonylamino)-β-phenylpropionylamido]-penicillanic acid.

Similarly to Example VII, there are obtained from the mixture 660 mg (S)-3-benzyloxycarbonyl-4-benzyl-oxazolidinone-5, obtained in the Example III, 440 mg 6-aminopenicillanic acid, 190 mg 2-hydroxypyridine, and 0.4 ml triethylamine in 2 ml pyridine, about 800 mg penicillin in the form of a free acid, whose purity, determined iodometrically, exceeds 70 percent.

The sodium salt of this acid is obtained by titration with 1 n sodium hydroxide in acetone-water solution.

The spectrum in infra-red shows characteristic bands 1780, 1705 cm$^{-1}$.

EXAMPLE X

The product obtained in this Example is the sodium salt of 6-[- (-) -α-(N-hydroxylmethyl-N-benzyloxycarbonylamino)-propionylamido]-pencillanic acid. Similarly to Example VII there are heated a mixture using 510 mg (S)-3-benzyloxycarbonyl-4-methyloxazolidinone-5 instead of 3-benzyloxycarbonyl-4-phenyloxazolidinone-5. There are obtained: penicillin in the form of a free acid in an amount of 710 mg with a purity of 65 percent, determined iodometrically.

The spectrum in infra-red of the sodium salt shows absorption bands 1785, 1705 - 1675 cm$^{-1}$.

EXAMPLE XI

The product obtained in this Example is 6-[α-(N-hydroxymethyl-N-benzyloxycarbonyl)-amino-p-methoxyphenylacetoamido]-penicillanic acid.

In 6 ml dry pyridine are introduced 1.34 g methoxyphenyloxazolidinone obtained according to the above Examples, 0.750 g 6-aminopenicillanic acid, 0.390 g 2-hydroxypyridine and 0.82 ml dry triethylamine.

The reaction is conducted in a water bath at a temperature of 45° - 55°C. within 2 hours with continuous stirring. After this time, a homogeneous syrupy mixture is obtained which is vacuum thickened and distributed in 50 ml water.

After the separation of layers, if need be, the aqueous layer is separated and again extracted by ether. The aqueous layer thus purified contains semi-synthetic penicillin in the form of salts. Through acidification with dilute hydrochloric acid above ethyl acetate, there is obtained a solution of penicillin in ethyl acetate, which is dried by means of magnesium sulphate and distilled by a vacuum method.

There is obtained 1.33 g semi-synthetic penicillin in the form of an acid with a purity of 80 percent.

The spectrum infra-red shows bands: 1790, 1710, 1040 cm$^{-1}$ and others.

EXAMPLE XII

The product obtained in this Example is 6-[α-(N-hydroxymethyl-N-benzyloxycarbonyl)-amino-p- hydroxyphenyl-acetamido]-penicillanic acid. Similarly as in Example XI, from 751 mg hydroxyphenyloxazolidinone there is obtained 700 mg penicillin with a purity above 70 percent, as determined iodometrically.

The spectrum in infra-red: 1780, 1720, 1040 cm$^{-1}$ and others.

EXAMPLE XIII

The product obtained in this Example is the sodium salt of [- (-) -α-aminophenylacetamido]-penicillanic acid.

a. To a hydrogen saturated suspension of 100 mg 10% palladium on active carbon in 1 ml water is poured the solution of sodium salt of 6-[- (-) -α-(N-hydroxymethyl-N-benzyloxycarbonylamino)-phenylacetamido]-penicillanic acid in 1 ml water.

The suspension is hydrogenated within half an hour, whereafter 50 mg palladium on active carbon is added. The hydrogenolysis is continued, while observing the evolution of $CO_2$, through its absorption in barium hydroxide.

The turbidity of the solution ceases after 1.5 hours from the time of beginning the hydrogenolysis. Thereafter the catalyst is filtered off, the filtrate is thoroughly washed with water and evaporated by vacuum method. After drying above phosphorus pentoxide, about 97 mg fine crystalline deposit is obtained, which contains 15 percent pure penicillin, iodometrically determined.

Quantitative paper chromatography - at Binotal standard - shows a similar content of α-aminobenzylpenicillin.

Microbiological tests also conform with the analysis results obtained: minimum inhibiting concentration was eightfold greater than minimum inhibiting concentration of the commercial product of this penicillin.

b. Similarly to Example XIII(a) 100 mg sodium salt of 6-[- (-) -α-(N-hydroxymethyl-N-p-nitrobenzyloxycarbonylamino)-phenylacetamido]-penicillanic acid was hydrogenated. There are obtained 80 mg substance containing 35 percent pure antibiotic. The comparative hydrogenolysis of the sodium salt of α-N-carbobenzoxyaminobenzylpencillin in these conditions yielded results with lower output, and similar to those obtained at the hydrogenolysis of the sodium salt of α-N-hydroxymethyl-N-benzyloxycarboamino derivatives of penicillin.

EXAMPLE XIV

The product obtained in this Example was the sodium salt of α-amino-p-methoxybenzyl penicillin. Similarly to Example XIII, by hydrogenolysis of 100 mg of the sodium salt of 6-α-(N-hydroxymethyl-N-benzyloxycarbonyl)-amino-p-methoxy-phenylacetamido-penicillanic acid, there are obtained 95 mg of deposit containing 18 percent pure penicillin.

EXAMPLE XV

The product obtained in this Example was the sodium salt of α-amino-p-hydroxybenzyl penicillin. By hydrogenation of 100 mg of the sodium salt of 6-[α-(N-hydroxymethyl-N-benzyloxycarbonyl)-amino-p-hydroxyphenylacetamido]-penicillanic acid, under conditions described in Example XIII, there are obtained 87 mg of the sodium salt of α-amino-p-hydroxybenzylpenicillin with a purity of 19 percent.

What is claimed is:

1. Amine derivatives of penicillin having the formula

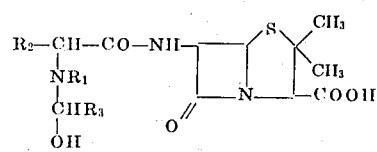

wherein $R_1$ is selected from the group consisting of benzyloxycarbonyl and p-nitrobenzyloxycarbonyl and $R_2$ is selected from the group consisting of phenyl, p-hydroxyphenyl, p-methoxyphenyl, propionyl and phenyl propionyl.

2. A method of producing the amine derivatives of penicillin as claimed in claim 1 comprising heating at a temperature of 45–55°C 6-aminopenicillanic acid or a salt thereof with oxazolidinone-5 having the formula

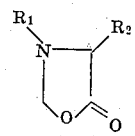

wherein $R_1$ and $R_2$ have the same meanings as defined previously.

3. A method as claimed in claim 2 wherein the oxazolidinone-5 is present in excess.

4. A method as claimed in claim 3 wherein the heating is effected with stirring in about 2 hours.

5. A method as claimed in claim 2 comprising subjecting the reaction product to catalytic hydrogenolysis in aqueous solution at room temperature to liberate the protection of the amino group.

6. A method as claimed in claim 2 wherein the 6-aminopenicillanic acid in dissolved in an organic solvent.

7. A method as claimed in claim 6 wherein said solvent is anhydrous pyridine.

8. A method as claimed in claim 2 wherein said heating is effected in the presence of 2-hydroxypyridine as a catalyst.

9. A method as claimed in claim 5 wherein the catalytic hydrogenolysis is effected in the presence of palladium as the catalyst.

* * * * *